US007137023B2

United States Patent
Lin et al.

(10) Patent No.: US 7,137,023 B2
(45) Date of Patent: Nov. 14, 2006

(54) AUXILIARY ALARM CLOCK SYSTEM FOR A PERSONAL COMPUTER

(75) Inventors: Chun-His Lin, Yi-Lan Shien (TW); James Lam, Fremont, CA (US)

(73) Assignee: 02 Micro, Inc., Santa Clara, CA (US)

( * ) Notice: Subject to any disclaimer, the term of this patent is extended or adjusted under 35 U.S.C. 154(b) by 340 days.

(21) Appl. No.: 10/692,211

(22) Filed: Oct. 22, 2003

(65) Prior Publication Data

US 2004/0250154 A1 Dec. 9, 2004

Related U.S. Application Data

(60) Provisional application No. 60/475,887, filed on Jun. 4, 2003.

(51) Int. Cl.
*G06F 1/04* (2006.01)
(52) U.S. Cl. ............... 713/500; 713/300; 713/324; 711/5; 710/62
(58) Field of Classification Search ............... 713/500, 713/324, 300; 711/5; 710/62; 704/270; 700/94; 379/93; 368/10, 28; 348/552; 345/211
See application file for complete search history.

(56) References Cited

U.S. PATENT DOCUMENTS

| 5,283,819 | A | * | 2/1994 | Glick et al. ............. 379/93.01 |
|---|---|---|---|---|
| 5,422,862 | A | * | 6/1995 | Wisor ........................ 368/10 |
| 5,758,172 | A | * | 5/1998 | Seo ............................. 713/300 |
| 5,829,008 | A | * | 10/1998 | Podkowa et al. ............. 711/5 |
| 6,105,142 | A | * | 8/2000 | Goff et al. .................. 713/324 |
| 6,134,187 | A | * | 10/2000 | Tomiyasu .................... 368/28 |
| 6,285,406 | B1 | * | 9/2001 | Brusky ....................... 348/552 |
| 6,286,063 | B1 | * | 9/2001 | Bolleman et al. ............ 710/62 |
| 6,414,675 | B1 | * | 7/2002 | Shen .......................... 345/211 |
| 2002/0099550 | A1 | * | 7/2002 | Emerick ..................... 704/270 |
| 2003/0045955 | A1 | * | 3/2003 | Janik ......................... 700/94 |

* cited by examiner

*Primary Examiner*—Thomas Lee
*Assistant Examiner*—Sean Weinman

(57) ABSTRACT

The present invention provides systems and methods to operate a PC as an alarm clock. An IC is provided to monitor the power status of PC and generate an alarm clock event at a preselected time. The alarm clock event includes a variety of operations, for example, powering on or off the PC system or controlling an AM/FM or TV module.

28 Claims, 1 Drawing Sheet

Block Diagram

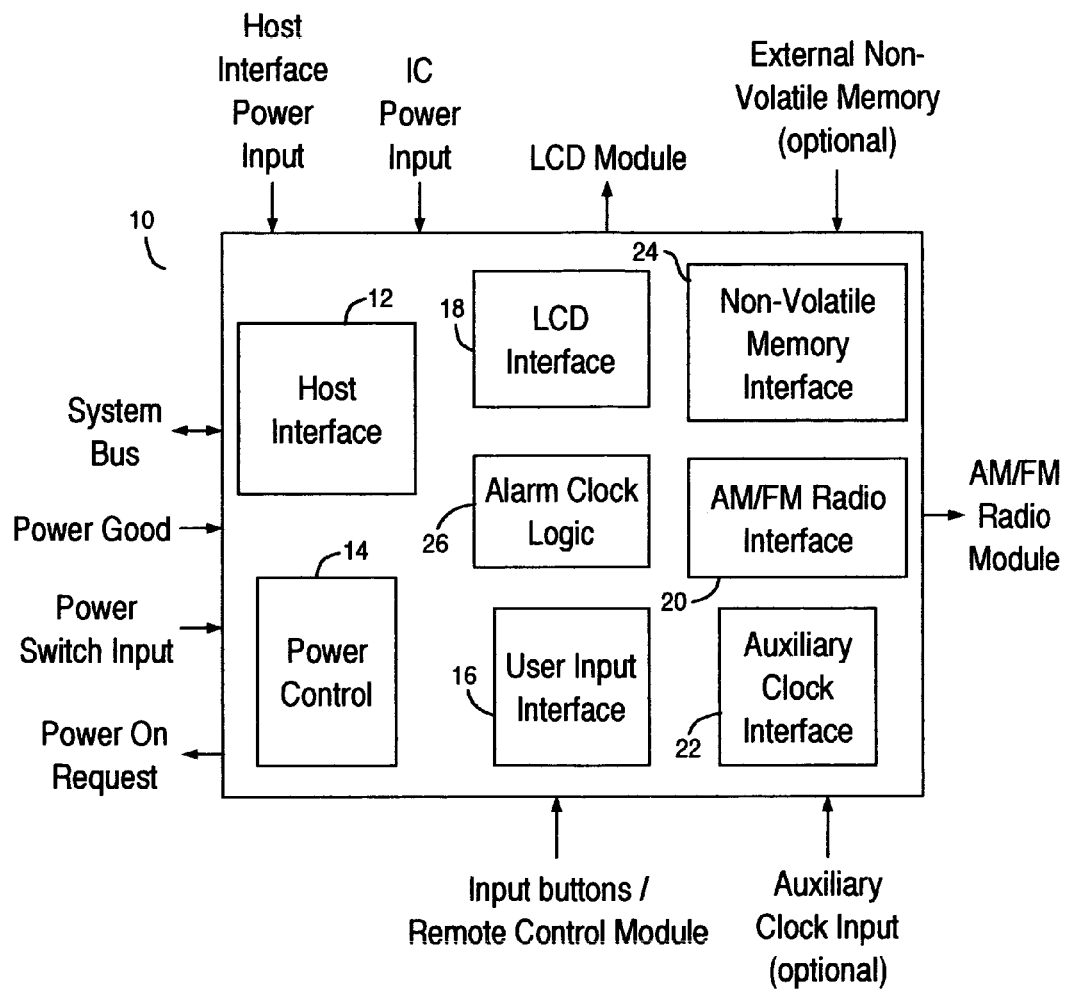
Figure 1 Block Diagram

AUXILIARY ALARM CLOCK SYSTEM FOR A PERSONAL COMPUTER

The present invention claims priority to Provisional Application Ser. No. 60/475,887, filed Jun. 4, 2003.

FIELD OF THE INVENTION

The present invention relates to enhancements for personal computers, and more particularly, to an alarm clock for a personal computer that is operable when main system power is on or off.

BACKGROUND OF THE INVENTION

Conventional PC systems may include a hardware/software built-in alarm clock system using the Real Time Clock (RTC). The RTC is controlled by the OS. The latest Operating Systems (e.g. Microsoft Windows®) allow the user to setup up a wakeup interrupt from the RTC alarm to power on the system. However, this approach requires a very complicated design. For example, a separated power plane on the system board is required to allow the chipset to receive the RTC wakeup interrupt signal when the rest of the system is powered off. On the other hand, to setup the clock requires the complete system boot up process and use the complicated Operating System to do a simple setup. Also, there is no indicator on the system to tell the current time or that the alarm is turned on.

SUMMARY OF THE INVENTION

The present invention provides a system and method to provide a cost effective and user friendly alarm clock solution. One exemplary implementation of the present invention is an IC that provides a simple and easy to use alarm clock function for the PC system. The IC of the present invention is operable when the system is turned off, and therefore does not require the PC system to be on to function properly. An interface may be provided, such as a LCD/LED/VFD or other display module interfaces, to provide complete user control over the IC when PC power is off. The IC may be implemented using a dual clock switch (host system clock and auxiliary clock) to allow the IC to work at different speed for different operation modes (PC system on/off). The IC also provides a control interface to that is adapted to generate control signals to control the operation of an optional internal AM/FM radio circuit, an external AM/FM radio circuit and/or other circuits such as a TV board associated with PC system that permits viewing of TV on the PC. The AM/FM circuit and/or TV board are only exemplary alarm functions that can be selected by the present invention, and the present invention is intended to be of broad scope in that any alarm function can be selected (for example, powering ON the computer system, loading a software program and generating an alarm tone through the audio system of the computer system). The IC may include non-volatile memory to permit the IC to auto configure and functional without the system bus interface. The IC can be implemented in many different approaches such as state machines or microprocessor based design.

In one aspect the present invention provides an alarm clock IC adapted for use in a personal computer (PC). The IC includes alarm clock logic circuitry adapted to receive a signal indicative of the power status of the PC and further adapted to generate an alarm clock event at a preselected time.

In another aspect the present invention provides an alarm clock PC system. The system includes a PC adapted to generate a signal indicative of the power status of the PC, and an alarm clock IC adapted to receive the signal indicative of the power status of the PC and further adapted to generate an alarm clock event at a preselected time.

In method form, the present invention provides a method of operating a PC as an alarm clock that includes the steps of monitoring the power status of the PC and generating an alarm clock event at a preselected time.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 1 is a block diagram of the alarm clock IC of the present invention.

DETAILED DESCRIPTION OF EXEMPLARY EMBODIMENTS

FIG. 1 depicts a block diagram of the alarm clock IC 10 according to the present invention. The IC 10 may include one or more of the following modular components.

1) Host Interface 12. The host interface provides a bus interface between the IC 10 and the PC system (e.g., PCI bus, SMBus, etc) and allows the PC system to control and access the IC 10. The interface 12 can be LPC (Low Pin Count), USB, SMB or any other system bus interface.

2) Power Control interface 14. The power control interface 14 is provided to control the PC system power. The Power Good signal can be an input into the IC, and may be used to indicate whether power is applied to the system bus or the PC system. Essentially, the power good signal is a signal indicative of the power status of the PC system (not shown).

3) User Input interface 16 provides user control over some basic functions of the IC such as alarm clock settings without the requiring the PC system Operating System. The interface 16 may be implemented as input buttons or a remote control transceiver module. An RF or IR remote control (not shown) may also be used with this interface.

4) Display module interface 18 provides a display interface for the end user to display the status of the IC, such as alarm is turned on. This generic interface can support both serial and parallel LCD, LED, VFD or other display module or driver.

5) AM/FM Radio Module interface 20 may be provided to send control signal to an AM/FM radio module associated with the PC system or the user input interface 16 when the PC system is powered off.

6) Auxiliary Clock interface 22. This clock interface provides the clock signal for the IC when the host interface 12 cannot provide the clock signal, i.e., when the PC system power is off. The auxiliary clock can be generated by a clock input or built-in internal clock oscillator.

7) Non-volatile memory interface 24. Non-volatile memory, which is accessible by 24, may be provided to generate initialization information for the IC if power is applied to the IC without the PC system power. If the IC includes the internal memory 24, external memory may not be required.

8) Alarm Clock Logic 26 provides the commands for the IC to function as an alarm clock.

9) Dual Power Inputs. In the exemplary embodiment, the IC 10 is adapted to accept two power inputs: a host interface power input and an IC power input. The host interface power is separated from the other portions of the IC. This permits, for example, the IC to continue to be functional with minimal power consumption when the PC system power is turned off. The Power Good input signal may be used to indicate when the system power is removed.

System is ON:

When the PC system is turned on, the system can use the host interface 12 to receive commands from the input buttons or remote control receiver inputs, via the user input interface 16. An application program may be provided in the PC system to decode and send the user inputs to the Operating System (e.g., Windows operating system). For example, the user can use the buttons to control the AM/FM radio channel, as generated by the control signal from the AM/FM interface 20 to the AM/FM radio module. The application program may also be adapted to automatically adjust the time inside the IC alarm clock logic 26 to match with the system RTC. The application program may also accept traditional keyboard or mouse input devices to setup the IC. The setup information can be stored in the internal or external non-volatile memory so that the IC can be functional without the system host, even when the power has been removed from the IC.

System Power Control:

The user can use the input buttons or remote controller to turn off the system power. When the system receive the system power down requests, the system can send the command back to the IC which will use the power control interface to turn off the system power. If there is another power switch input on the system, it can be connected to the IC to eliminate the system board design change for multiple power switch controls.

System is OFF:

The Power Good is used to indicate the host system power is removed. The IC will continue to be functional with the IC power input. If the system power is off, the clock input is switched to the auxiliary clock input. Preferably, the auxiliary clock can be slowed to save power consumed by the IC. Since the system has a slow clock (e.g., 32.768 Khz) for the RTC, it can be connected to the IC. In this case, the IC would be running at clock rate of the RTC. This may help eliminate the time discrepancy problem due to different clock inputs between the IC 10 and system clock.

When the PC system is off, the user may also use the IC user input interface to setup the alarm clock or turn on the AM/FM radio. The display module interface is adapted to control an LCD, LED, VFD or other display to provide the information of the user inputs and the setting information. The setting can be stored in the internal or external non-volatile memory 24.

When the PC system power is off, the non-volatile memory interface 24 will automatically load the initialization information into the IC to perform a predefined setup. This may eliminate most or all manual setup after a power failure which results in total power loss.

Alarm Clock Logic:

When the alarm time is reached, the IC can automatically turn on the AM/FM radio associated with the PC system. The radio interface 20 generates the appropriate commands and data to the external radio module. Alternatively, the alarm clock logic can be adapted to turn the PC system on. If the system is turned on, an application program can also detect the alarm setting of the IC and invoke other application programs such as turning on the TV tuner inside the system. The application program may turn on the AM/FM radio external circuitry if it is not connected to the IC directly.

The alarm clock function can also provide Sleep Power Down function. For example, the computer system may be turned on for TV function. The alarm clock logic may be adapted to send out an interrupt (through the host interface) or power down signal (through the power control interface) to the system when the sleep timer reaches the time to turn off the system power automatically. To further reduce the power consumption, the AM/FM radio module may be powered down by the IC when it is not required (not shown in the block diagram).

As described above, numerous alarm clock events can occur using the alarm clock logic of the present invention. For example, some exemplary alarm clock events described herein include controlling an internal or external AM/FM radio module, TV module, powering up the system to launch an application, powering down the system, and/or other event. It should be understood that those skilled in the art will recognize numerous modifications to the specific alarm clock events described herein, and all such modifications are deemed within the broad concepts of the present invention. Therefore, the term "alarm clock events" shall be construed broadly to mean any event that trigger a multimedia component of the IC and/or PC system, or powering ON or OFF the PC system, at a user-specified or preprogrammed (i.e. preselected) time. Multimedia components include, for example, AM/FM radio modules, TV modules, DVD play applications, CD-ROM or audio music play applications, or other components that generate video or sound. Likewise, the alarm clock logic 26 described herein shall also be construed broadly as circuitry adapted to generate one or more "alarm clock events".

As should be evident from the exemplary embodiments described herein, the alarm clock IC of the present invention is adapted to monitor the power status of the PC and generate an alarm clock event based upon Those skilled in the art will recognize that the IC 10 of the present invention combines several modular components to accomplish the stated functionality. The IC 10 and one or more of the modular components can be constructed out of conventional and/or custom circuitry and/or state machine circuits without departing from the scope of the present invention. Additionally, the present invention describes application programs (run on the PC system) to accomplish some functionality associated with control or operation of the alarm clock IC 10. Those skilled in the art will recognize that such application programs can be formed of conventional and/or proprietary programming and source code to perform the stated functionality, all of which should be readily apparent to those skilled in the art and which are deemed within the spirit and scope of the present invention.

A PC system may be adapted with the IC 10 described herein, and such PC system may include a laptop or desktop PC.

The invention claimed is:

1. An alarm clock IC adapted for use in a personal computer (PC) having a system Real Time Clock (RTC), comprising alarm clock logic circuitry adapted to receive a signal indicative of a power status of said PC, adapted to adjust time inside said alarm clock IC to match with said system RTC, and further adapted to generate an alarm clock event at a preselected time.

2. The alarm clock IC as claimed in claim 1, wherein said alarm clock event comprises the generation of a control signal to control an AM/FM radio module associated with said PC.

3. The alarm clock IC as claimed in claim 1, wherein said alarm clock event comprises the generation of a control signal to control a TV module associated with said PC.

4. The alarm clock IC as claimed in claim 1, wherein said alarm clock event comprises the generation of a control signal to control an audio circuit associated with said PC.

5. The alarm clock IC as claimed in claim 1, further comprising power control circuitry and wherein said alarm clock event comprises the generation of a control signal to control said power control circuitry to turn ON said PC system based upon said signal indicative of the power status of said PC.

6. The alarm clock IC as claimed in claim 1, further comprising power control circuitry and wherein said alarm clock event comprises the generation of a control signal to control said power control circuitry to turn OFF said PC system based upon said signal indicative of the power status of said PC.

7. The alarm clock IC as claimed in claim 1, wherein said alarm clock event comprises the generation of a control signal to launch an application program associated with said PC, said application program adapted to control one or more modules associated with said PC.

8. The alarm clock IC as claimed in claim 1, further comprising a user input interface adapted to permit a user to control the functionality of said alarm clock logic circuitry.

9. The alarm clock IC as claimed in claim 1, further comprising a display module interface adapted to control a display and adapted to display status information related to said alarm clock logic circuitry.

10. The alarm clock IC as claimed in claim 1, further comprising a host interface adapted to interface said alarm clock logic circuitry to a bus associated with said PC.

11. An alarm clock PC system, comprising:
a PC adapted to generate a signal indicative of a power status of said PC and having a system Real Time Clock (RTC); and
an alarm clock IC adapted to receive said signal indicative of the power status of said PC, adapted to adjust time inside said alarm clock IC to match with said system RTC, and further adapted to generate an alarm clock event at a preselected time.

12. The alarm clock PC system as claimed in claim 11, wherein said alarm clock event comprises the generation of a control signal to control an AM/FM radio module associated with said PC.

13. The alarm clock PC system as claimed in claim 11, wherein said alarm clock event comprises the generation of a control signal to control a TV module associated with said PC.

14. The alarm clock PC system as claimed in claim 11, wherein said alarm clock event comprises the generation of a control signal to control an audio circuit associated with said PC.

15. The alarm clock PC system as claimed in claim 11, said alarm clock IC further comprising power control circuitry and wherein said alarm clock event comprises the generation of a control signal to control said power control circuitry to turn ON said PC system based upon said signal indicative of the power status of said PC.

16. The alarm clock PC system as claimed in claim 11, said alarm clock IC further comprising power control circuitry and wherein said alarm clock event comprises the generation of a control signal to control said power control circuitry to turn OFF said PC system based upon said signal indicative of the power status of said PC.

17. The alarm clock PC system as claimed in claim 11, wherein said alarm clock event comprises the generation of a control signal to launch an application program associated with said PC, said application program adapted to control one or more modules associated with said PC.

18. The alarm clock PC system as claimed in claim 11, said alarm clock IC further comprising a user input interface adapted to permit a user to control the functionality of said alarm clock logic circuitry.

19. The alarm clock PC system as claimed in claim 11, said alarm clock IC further comprising a display module interface adapted to control a display and adapted to display status information related to said alarm clock logic circuitry.

20. The alarm clock PC system as claimed in claim 11, said alarm clock IC further comprising a host interface adapted to interface said alarm clock logic circuitry to a bus associated with said PC.

21. A method of operating a PC as an alarm clock, said method comprising the steps of
monitoring a power status of said PC;
matching time of said alarm clock with a system Real Time Clock (RTC); and
generating an alarm clock event at a preselected time.

22. The method as claimed in claim 21, further comprising the step of, in response to said alarm clock event, controlling an AM/FM radio module associated with said PC.

23. The method as claimed in claim 21, further comprising the step of, in response to said alarm clock event, controlling a TV module associated with said PC.

24. The method as claimed in claim 21, further comprising the step of, in response to said alarm clock event, controlling an audio circuit associated with said PC.

25. The method as claimed in claim 21, further comprising the step of, in response to said alarm clock event, generating a control signal to turn ON said PC system based upon said power status of said PC.

26. The method as claimed in claim 21, further comprising the step of, in response to said alarm clock event, generating a control signal to turn OFF said PC system based upon said power status of said PC.

27. The method as claimed in claim 21, further comprising the step of, in response to said alarm clock event, launching an application program associated with said PC, said application program adapted to control one or more modules associated with said PC.

28. The method as claimed in claim 21, further comprising the step of displaying status information related to said alarm clock event.

* * * * *